Patented Oct. 10, 1944

2,359,979

UNITED STATES PATENT OFFICE 2,359,979

LUBRICANT AND PROCESS OF MANUFACTURE

Ernest F. Engelke, Merchantville, N. J., assignor to Cities Service Oil Company, New York, N. Y., a corporation of Pennsylvania No Drawing. Application January 1, 1942, Serial No. 425,379

10 Claims. (Cl. 252—53)

This invention relates to the manufacture of improved organic phosphorus compounds and compositions containing such compounds. More particularly the invention relates to the manufacture of organic phosphorus compounds which are particularly useful as addition agents for oil compositions generally and for the manufacture of lubricants, greases, and flushing oils in which a film strength agent is desirable or necessary.

Many processes have been devised for manufacturing organic phosphorus compounds both from relatively pure and from relatively crude materials, and many patents have been granted on organic phosphorus derivatives for use as film strength agents. The primary object of the present invention is to provide improved organic phosphorus compounds of undetermined composition which are suitable as film strength agents.

Another object of the invention is to provide an improved process for the manufacture of organic phosphorus compounds of undetermined composition but which are effective as oil addition agents for improving the film strength of oil compositions.

A further object of the invention is to provide an improved process for utilizing relatively inexpensive hydrocarbon materials for the manufacture of organic phosphorus compounds suitable for use as film strength agents.

Having in mind the foregoing objects, the improved organic phosphorus compounds of the present invention comprise reaction products formed by the action of a phosphorizing agent on crude, inexpensive materials such as cracked petroleum residues, especially residues produced by vapor phase cracking and certain relatively high boiling fractions thereof.

The improved process of the present invention for the manufacture of such organic phosphorus products of unknown composition includes the steps of reacting a phosphorizing agent such as a phosphorus halide, for example, $PCl_3$, $POCl_3$, and $PSCl_3$, at elevated temperatures of the order of 400° F., and sometimes under vacuum conditions, with a cracked petroleum residue or a fraction of such a residue. The product resulting from the phosphorizing action of one of these agents is neutralized and otherwise purified for use in blending with lubricating oil stocks for the manufacture of lubricants or with light hydrocarbons such as No. 2 furnace oil, and other organic materials for the production of flushing compositions adapted particularly for the flushing of the crank cases of automobiles. The organic phosphorus products produced in accordance with the present invention are believed to comprise phosphorus derivatives in which there is a carbon-phosphorus linkage between the hydrocarbon constituents of the cracked residue and the phosphorus of the phosphorizing agent. When $PCl_3$ is used as the phosphorizing agent, the product will contain phosphorus, carbon and hydrogen, with possibly traces of chlorine.

The use of $POCl_3$ will produce compounds in which oxygen remains in the product, the latter in most cases undoubtedly containing three hydrocarbon constituents directly attached to a phosphorus atom. Similar results will be obtained with $PSCl_3$ in which sulfur (S) occupies the same position as oxygen.

The method of manufacturing the improved organic phosphorus products and compositions containing such products, as well as the effectiveness of the organic phosphorus products in such compositions may be illustrated by reference to the following specific examples.

Example 1

A number of different organic phosphorus-containing products were made from fractions obtained by the vacuum distillation of a heavy cracked residuum produced in a vapor phase cracking process. The cracking process from which this residuum was obtained was one in which a distillate stock such as gas oil was vaporized and cracked at relatively high temperature of about 1000° F. and a pressure of about 300 lbs. per square inch. The vapors of the gas oil were cracked for a considerable period of time to produce a gasoline range boiling material containing upwards of 75% of aromatic hydrocarbons. The residuum from such an operation contains such high boiling apparently aromatic constituents, that there is no known procedure for making an analysis. It is believed however that the residuum contained very substantial proportions of complex aromatic compounds.

In the vacuum distillation of this cracked residuum, nine fractions were made and all used for making organic phosphorus products. Certain specific fractions will be referred to for purposes of illustration. In each case however the fraction was mixed with approximately 5% by volume of $PCl_3$, $POCl_3$ or $PSCl_3$ and heated gradually for a period of ten or twelve hours to a temperature of from 400° to 440° F. in an apparatus provided with a reflux condenser. The reaction was regarded as complete when evolution of gaseous hydrochloric acid had stopped. The reaction mixture was settled for the removal of a small proportion of sludge and then the supernatant oil was redistilled and neutralized by washing with water and then with a very dilute solution of caustic soda.

One particular product made from an overhead fraction boiling from about 650° to 710° F. and having a specific gravity of 1.077, gave a phosphorized product, upon reaction with 7% by volume of $PCl_3$, which had an initial boiling point of 176° F. and had an end boiling point of 510° F. at a pressure of 55 mm. of Hg. This product had a specific gravity of 1.0826, a pour point of 5° F., and contained approximately 0.051% of phosphorus. This phosphorized product was blended with 20 S. A. E. Pennsylvania lubricating oil to the extent of 5% by volume and the blend showed a load-carrying capacity on the Timken testing machine of approximately 20,000 lbs. per square inch; whereas the Pennsylvania lubricating oil alone had a load-carrying capacity of only about 9000 lbs. per square inch.

Some of the other fractions of the cracked residuum handled in the same way and blended with the same lubricating oil gave compositions having load-carrying capacities of from about 15,000 lbs. per square inch up to 30,000 lbs. The highest boiling fraction of the cracked petroleum residue produced the composition having the highest load-carrying capacity, that is, 30,000 lbs. per square inch. The phosphorized product in this case distilled over with an end point of about 570° F. at a pressure of 32 mm. of Hg.

The compositions made by blending the phosphorized product with the Pennsylvania lubricating oil stock were tested for wear on the Sibley testing machine and were found to be very satisfactory for most all bearing materials including Cd-Cu-Ag-steel, Cu-Pb-steel and the Babbitt bearings. In most instances, the film strengths after the wear test on the compositions were higher than that of the original oil, for example, the composition referred to above as having a film strength of approximately 20,000 lbs. per square inch had a film strength of 24,800 after the wear test, which was equivalent to a service use of the oil in the crank case of an automobile of about 1000 miles.

*Example No. 2*

A blend of the phosphorized fractions 1 to 8 as made from the cracked petroleum residuum was tested for load-carrying capacity and found to carry 28,900 lbs. on the Timken testing machine, when blended in the proportion of 5% by volume with a Pennsylvania 30 S. A. E. motor oil, which alone had a load-carrying capacity of only 9,200 lbs. per square inch. The wear test as determined on the Sibley machine gave very excellent results for all of the types of bearing metals referred to above. The mixture of phosphorized products made from cuts 1 to 8 had a specific gravity of 1.008 and a refractive index of 1.5949.

*Example No. 3*

A number of the vacuum distillates produced from the cracked residuum referred to in Example No. 1 were phosphorized with $POCl_3$ under substantially the same conditions as that described in Example No. 1, in connection with the use of $PCl_3$, except that the refluxing was continued for a longer period of time. The resulting phosphorus-containing products were tested for various characteristics. For example, the product made from fraction No. 4 had a specific gravity of 1.037, a refractive index of 1.6053, and a pour point of zero degrees Fahrenheit. This product contained 0.006% of phosphorus and when blended with 20 S. A. E. Pennsylvania lubricating oil in the proportion of 5% by volume increased the load-carrying capacity from 9000 lbs. per square inch to 21,000 lbs. per square inch (Timken). Another product made from fraction No. 8 which had a specific gravity of 1.123, a refractive index of 1.6732, and a pour point of 25, increased the load-carrying capacity of the above-mentioned oil to 22,600 lbs. per square inch on the Timken testing machine. The phosphorized product in this case contained 0.079% of phosphorus.

The oil blended with these phosphorized products showed up very satisfactorily in the wear tests on the Sibley testing machine. In general, however, it is believed that the phosphorized products produced by use of $PCl_3$ were slightly better than those produced from $POCl_3$.

*Example No. 4*

Some of the fractions of the cracked residuum referred to in Example No. 1 were phosphorized with 5% by volume of $PSCl_3$ and satisfactory products were produced, although they are not regarded as suitable in some respects as those produced with $PCl_3$. Fractions 1 and 2 of the residuum when phosphorized with $PSCl_3$ substantially under the same conditions as described in Example No. 1, gave products which, when blended with 20 S. A. E. Pennsylvania lubricating oil in the proportion of 5% by volume, had load-carrying capacities respectively of 21,500 and 25,800 lbs. per square inch. The oil alone had a load-carrying capacity of 9,000 lbs. per square inch on the Timken testing machine. These compositions were tested for wear on the Sibley machine and showed somewhat higher losses for the various bearing materials than the composition made from the $PCl_3$ phosphorized products. However, the Cd-Cu-Ag-steel bearings invariably came out smooth and bright with only slight losses.

*Example No. 5*

A portion of the cracked residuum produced by the cracking procedure described above was extracted with about 2½ parts by volume of secondary butyl alcohol, and 400 parts of the resulting extract were phosphorized with 60 parts by volume of $PCl_3$, at approximately the conditions described in Example No. 1. The resulting phosphorized product was blended with a 30 S. A. E. Mid-Continent lubricating oil to the extent of 2% by volume. This composition had a load-carrying capacity of 28,800 lbs. per square inch on the Timken testing machine, whereas the oil alone had a load-carrying capacity of only 11,200 lbs. per square inch. This composition showed very low loss for the various bearing metals when tested in the Sibley machine.

*Example No. 6*

Film strength agents are not only useful in motor oils, greases and other types of lubricants, but are also useful in flushing oils employed for the removal of used motor oil and residual constituents from the crank cases of automobiles and from other lubricated parts of various types of mechanism, where the oil is changed periodically. It is now generally recognized that in case of automobiles, the residue left in the crank case after draining, very materially affects the new motor oil used for filling the crank case. Consequently, the practice of flushing or cleaning the crank case after draining is now recognized as being of the utmost importance. The products made in accordance with the present invention are especially adapted for use in flushing oils because of their solvent action on the sludge deposits in the crank case and because they impart extreme pressure properties to the flushing oil and therefore lubricate the parts of the engine while it is being operated and flushed.

Phosphorized products especially useful in flushing oils have been made from recycle (cracked) gas oils by phosphorizing them with the various agents referred to above. In a particular instance 100 parts of recycle gas oil of 26.2° Bé. gravity, containing approximately 24% by volume of unsaturated hydrocarbons was reacted with 10 parts by volume of PCl$_3$ in the vapor phase. In carrying out the phosphorization, the PCl$_3$ was vaporized and passed into the vapor space of a still in which the gas oil was vaporized. The mixed vapors were conducted through a reaction section of the apparatus and reacted at a temperature of from 320° to 345° F. under a reduced pressure of 80 to 90 mm. of Hg. The vapors from the reaction section of the apparatus were conducted directly through a condenser and cooler connected with a vacuum pump and a receiver. The condensed product was neutralized and purified except for redistillation in the manner described above in Example No. 1. The reaction product contained approximately 0.06% of phosphorus and when diluted in the ratio of 1 to 3 parts by volume of No. 2 furnace oil of 31.5° Bé. gravity, the resulting composition had a load-carrying capacity of 15.900 lbs. per square inch on the Timken testing machine. This compared with a load-carrying capacity of 14,200 lbs. for a standard commercial flushing oil which also contained the same furnace oil as a major constituent. The composition containing the phosphorized product as produced above was also compared with the standard flushing oil in ability to dissolve the sludge from an automobile crank case. The new product was found to be more effective than the standard product in the ratio of 41.6 to 24.8.

*Example No. 7*

Cracked gas oils were phosphorized in vapor phase and at slightly different conditions with PCl$_3$, POCl$_3$ and PSCl$_3$, used in proportions of about 10% by volume. The operations were carried out at progressively lower pressures and progressively higher temperatures. The PCl$_3$ run was made at temperatures from 260° to 480° F. and at pressures ranging from 163 to 91 mm. of Hg. The POCl$_3$ run was made at temperatures of from 260° to 474° F. and pressures of from 164 to 86 mm. of Hg. The PSCl$_3$ run was made at temperatures of from 322° to 460° F. and pressures of from 183 to 36 mm. of Hg.

The resulting products were purified in the manner described in Example 6, and diluted in the ratio of 1 to 8 with the No. 2 furnace oil and the resulting compositions tested on the Timken machine. The product made with PCl$_3$ had a load-carrying capacity of 17,000 lbs. per square inch; that made with POCl$_3$, 15,850; and that made with PSCl$_3$, 15,600. Each of these compositions, containing one part of phosphorized product to eight parts by volume of No. 2 furnace oil of 31.5° Bé. gravity were compared with a commercial flushing composition in dissolving a crank case sludge. The effectiveness respectively of the three compositions and the commercial product were found to be of the order of that represented by the following:

59.8 for the PCl$_3$ product
70.6 for the POCl$_3$ product
65.2 for the PSCl$_2$ product
65.3 for the commercial flushing oil The commercial flushing oil contained 10% of industrial xylol and one per cent of octyl alcohol, and therefore these compounds were added to the three compositions in about the same ratio for the sludge solvency tests.

*Example No. 8*

The material treated with PCl$_3$ according to this example was obtained from a Mid-Continent cracking still residuum having a specific gravity of 1.0275, a Saybolt viscosity at 210° F. of 70.7 seconds, and a Conradson carbon residue value of 10.8%. This material was subjected to distillation to produce an overhead product, the distillation being completed at a temperature of 640° F. and a pressure of 34 mm. of Hg. This overhead fraction comprised about 85% of the cracking still residue, had a specific gravity of 0.985, a Saybolt viscosity at 210° F. of 40.0 seconds, and a Conradson carbon residue value of 0.94%. Two separate portions of this material were phosphorized with PCl$_3$, one portion receiving a preliminary wash with a 10° Bé. solution of caustic soda, and the other a preliminary wash with a 1 to 1 mixture of the same caustic soda solution and methanol. The phosphorization of these two washed portions was effected with 10% by volume of PCl$_3$ with gradual heating up to a temperature of 400° F. for a period of six to eight hours. The reaction products in both instances were settled and the clear decanted oils distilled under 30 mm. of Hg. to obtain overhead products which were used as blending materials.

The product produced from the stock washed with alcoholic caustic soda had a specific gravity of 0.9001, a Saybolt viscosity at 210° F. of 61.6, an NPA color of 5.2, a refractive index of 1.4973 and a Conradson carbon residue value of 0.31. This material, when blended in the proportion of 2% by volume with a 30 S. A. E. Mid-Continent lubricating oil, had a load-carrying capacity on the Timken testing machine of 29,800 lbs. per square inch before Sibley wear tests, and 33,000 afterward. The blank had a load-carrying capacity of 11,200 lbs. per square inch.

The material which was merely pretreated with a caustic soda wash alone had comparable properties to the alcoholic soda washed material. For example, the specific gravity was 0.9013, viscosity at 210° F. of 62.0 seconds, NPA color 5.2, refractive index 1.4969, Conradson carbon residue value 0.28%. The load-carrying capacity (blended as above) was 29,800 on the Timken testing machine before Sibley wear tests and 27,900 afterward. The blank was the same as above. The Sibley wear tests were very satisfactory, but were slightly better for the alcoholic soda treated material. All bearings of the types referred to above were smooth and bright with practically no tarnish or corrosion. The weight losses were extremely low.

The vacuum distillate of the Mid-Continent residuum was also phosphorized with PCl$_3$ without the caustic pretreatment, but the resulting products were greatly inferior to those described above and much more corrosive. The products produced where the caustic pretreatment was employed showed about twice the film strength, were non-corrosive and showed practically no wear on the various types of bearings.

*Example No. 9*

Instead of distilling the Mid-Continent cracked residuum as described in Example 8, that material was extracted at 180° F. with about two volumes of furfural which took up approximately one-third of the residuum. After removal of the furfural from the extract, it was distilled at reduced pressure, and the overhead reacted with 5% by volume of $PCl_3$ under substantially the conditions described in Example 8, except that the overhead material was not pretreated with caustic soda solution. The resulting phosphorized product, which was obtained as an overhead distillate, when blended in the proportion of 2% by volume with a 30 S. A. E. Mid-Continent motor oil, had a film strength of 28,800 lbs. per square inch on the Timken testing machine before Sibley wear tests and 26,500 afterward. The blank showed 11,000 lbs. per square inch. The losses on the various bearings were extremely low so that there was practically no corrosion. The product produced by extracting the Mid-Continent cracking still residuum at 220° F. had practically the same properties as the above.

While in the foregoing examples it is apparent that the products produced from various cracking still residuum give excellent addition agents for various purposes without the preliminary alkaline wash, the process preferably includes such a treatment, and if possible, a pretreatment with an alkaline wash. Various alkaline agents may be employed and also various alcohols for this preliminary washing, neutralization and extraction operation.

The phosphorized products produced from cracking still residual stocks may be employed as film strength agents in various types of compositions, such as cutting oils, lubricants, greases, and flushing compositions. The cutting oils may be merely blends of light oil and from 2% to 7% of the film strength agent, or they may be emulsions containing the film strength agent. Greases and lubricants containing the same percentage range of film strength agent may be made for any particular purpose. A suitable crank case flushing composition may comprise 2% of the film strength agent, about 87% of a light hydrocarbon such as No. 2 fuel oil of 31.5° Bé. gravity, 10% of xylol, and 1% of a high boiling alcohol such as octyl alcohol, the percentages being by volume. The proportion of film strength agent may vary from 2% to 5% as desired. The improved phosphorized products may be employed alone as lubricants.

The improved products of the present invention include phosphorus compounds of unknown composition but in which it is believed that the hydrocarbons are linked directly to the phosphorus atoms with a phosphorus carbon linkage. All chlorine atoms in the phosphorizing agents are believed to be replaced in the reactions carried out in accordance with the foregoing examples, since such reactions are continued until the evolution of hydrochloric acid ceases.

It will be apparent to those skilled in the art that various modifications may be made in the procedure and in the compositions made from the products produced by the improved process. Such modifications are intended to be covered by the claims, which define the invention.

Having thus described the invention in its preferred form what is claimed as new is:

1. The method of preparing a lubricating oil composition which comprises vaporizing unsaturated aromatic hydrocarbon material from a cracked aromatic petroleum residuum, mingling with the resulting vapors a phosphorus chloride vapor and reacting it with said hydrocarbon vapor to produce a product containing phosphorus linked to carbon, said product having a specific gravity of at least one, and compounding the resulting phosphorus-containing product with a relatively large proportion of a lubricating oil.

2. The method as defined by claim 1 in which said residuum is pretreated with an alkaline solution.

3. The method as defined by claim 1 in which said residuum is pretreated with an alcoholic alkaline solution.

4. A composition comprised essentially of a hydrocarbon oil and a relatively small proportion of an extreme pressure agent including aromatic hydrocarbon derivatives of phosphorus in which the phosphorus is linked directly to carbon, the aromatic hydrocarbons being high boiling aromatic constituents derived from an aromatic cracked petroleum residuum, said agent having a specific gravity of at least one, being substantially free of halogen, and being present in the composition in sufficient proportion to impart extreme pressure properties thereto.

5. The method of preparing a lubricating oil composition which comprises reacting a high boiling aromatic cracked petroleum residuum having a specific gravity of about one with a phosphorus halide at a temperature of about 400° F. and thereby producing a product having a specific gravity of at least one containing aromatic phosphorus derivatives in which the phosphorus is linked directly to carbon, and compounding the resulting product with a lubricating oil stock in sufficient proportion to impart extreme pressure properties thereto.

6. An extreme pressure lubricant comprising a major proportion of a mineral lubricating oil and a minor proportion of an extreme pressure agent comprising high boiling aromatic hydrocarbon phosphorus compounds in which phosphorus is linked directly to carbon, said agent being prepared by chemically reacting a phosphorus halide at a temperature of about 400° F. for a period of hours with a high boiling aromatic residual hydrocarbon product having a specific gravity of approximately one, produced in a petroleum hydrocarbon oil cracking operation, said agent being present in said lubricant in sufficient proportion to impart extreme pressure properties thereto.

7. An extreme pressure lubricant as defined by claim 6 in which said residual hydrocarbon product is an alkali treated vacuum distillate of an oil residuum produced in a petroleum oil cracking operation.

8. A composition comprising a major proportion of hydrocarbon oil and a minor proportion of an organic phosphorus-containing product in which phosphorus is linked directly to a carbon of an aromatic hydrocarbon, said product being prepared by vaporizing unsaturated aromatic hydrocarbon material from a cracked aromatic petroleum hydrocarbon residuum, which has been pretreated with an alkaline solution, reacting the vaporized aromatic material with a phosphorus halide phosphorizing agent at a temperature of about 400° F., distilling the resulting reaction product and neutralizing the resulting overhead distillate product, said product being present in the composition in sufficient proportions to impart extreme pressure properties thereto.

9. A composition comprising a major proportion of a mineral oil and a minor proportion of a phosphorus-containing product in which the phosphorus is directly linked to the carbon of a high boiling aromatic hydrocarbon product, said product being prepared by chemically reacting a phosphorus halide at a temperature of approximately about 400° F. with an aromatic cracked petroleum residuum, the resulting phosphorus-containing reaction product having a specific gravity in excess of one, a refractive index in excess of 1.5900, being substantially free of halogen, and being present in said composition in sufficient proportion to impart extreme pressure properties thereto.

10. An extreme pressure lubricant comprised essentially of a mineral lubricating oil containing approximately 5% by volume of a phosphorized aromatic petroleum hydrocarbon cracking still residuum in which the phosphorus is linked to carbon, said phosphorized residuum being prepared by chemically reacting a phosphorus halide with a petroleum hydrocarbon cracking still residuum at an elevated temperature, said phosphorized residuum having a specific gravity of at least about one and a refractive index greater than 1.500.

ERNEST F. ENGELKE.